W. M. PRATHER.
VAULT LIGHT.
APPLICATION FILED APR. 11, 1911.
1,049,530.
Patented Jan. 7, 1913.
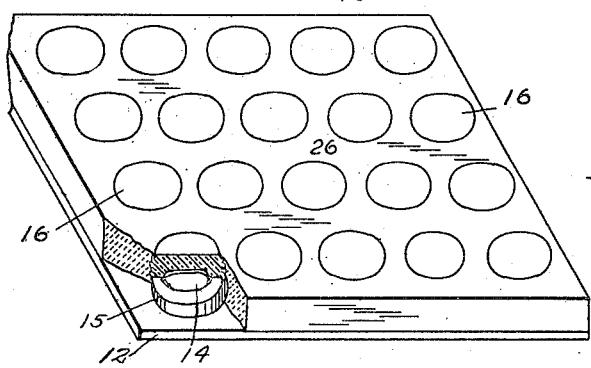
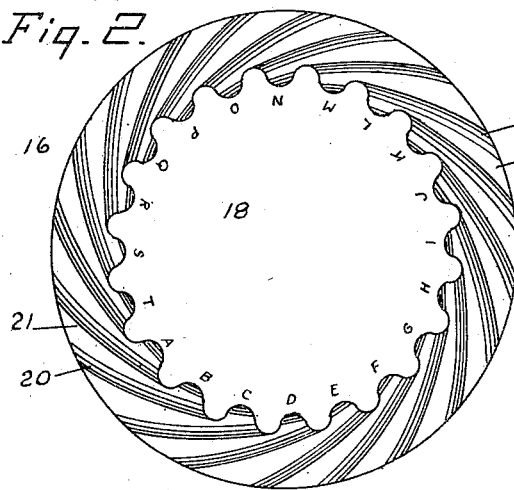
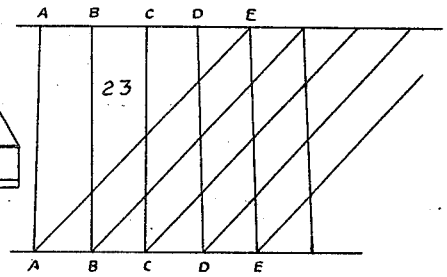
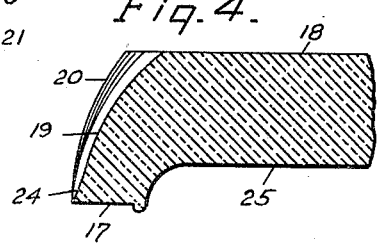
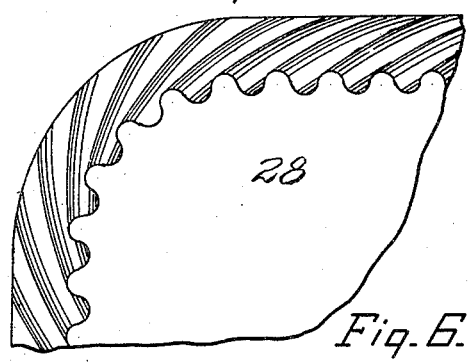
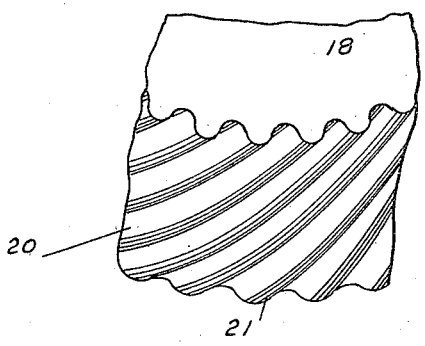
Witnesses.
C. L. Bronow
Francis N. Leach
Inventor
Willis M. Prather
By Rich & Manning Attorney.

UNITED STATES PATENT OFFICE.

WILLIS M. PRATHER, OF KANSAS CITY, MISSOURI.

VAULT-LIGHT.

1,049,530.

Specification of Letters Patent.

Patented Jan. 7, 1913.

Application filed April 11, 1911. Serial No. 620,500.

*To all whom it may concern:*

Be it known that I, WILLIS M. PRATHER, a citizen of the United States of America, residing at Kansas City, in the county of Jackson and State of Missouri, have invented certain new and useful Improvements in Vault-Lights; and I do hereby declare that the following is a full, clear, and exact description of the invention, reference being had to the accompanying drawing, forming a part of this specification.

The destructive force of stresses set up in opposition to each other in associated materials of varied expansibility when subjected to high degrees of temperature, and particularly in such substances as cement concrete and a vitreous body or conglomerate, in which the homogeneity of the substances vary, contraction and expansion also vary in proportion to density and their heat absorbing properties.

In the construction of concrete pavements for vaults small bodies or inlays of glass are embedded, and through which glass rays of light are transmitted, this class of pavements being known as vault lighting pavements. In these pavements the glass is in the form of blocks or rosettes, varied in form and of a thickness corresponding to the thickness of the pavement, and arranged in rows upon a perforate base surrounded by cement concrete, forming contact with the sides of the glass block or inlay, sufficient to exclude water. Owing to the absorption of heat by the glass and cement concrete with varying intensity, the expansive force of the latter upon the glass rosettes or inlays and the expansion of the rosettes from heat rays, such as the sun, the greater stress of the concrete is exerted to overcome the weaker stress of the glass rosettes, this force acting upon the sides of the glass and the upper surface of the glass in which direction the stresses find the least resistance, begins to chip away gradually until the glass becomes disfigured and destroyed. Whatever forms of construction of the blocks or rosettes which have for their object adherence to the concreting material, also increase the tendency of the concrete to chip in laminations, and destroy the usefulness and appearance of the light-transmitting blocks or bodies.

To overcome and to eliminate the destructive forces of expansion of the self hardening composition and vitreous bodies upon each other is the first object of the invention.

Another cause of injury to these glass blocks or rosettes occurs from what is known as vibrating stresses, set up in concrete pavements, from changing loads, such as arise from the traveling movements of pedestrians or vehicles upon the pavement and consequent contraction of the upper surface of the concrete body.

To overcome this contraction upon the body of the glass encompassed by the concrete is the second object of the invention.

The absence of cohesion of cement concrete with the body of glass which it surrounds, admits more readily the overcoming of the weaker stresses of the glass body in the pavement, and to deflect opposing stresses is the third object of the invention.

The invention consists in the novel means for attaining these results, which will be first fully described and then specifically pointed out in the claims.

In the drawings: Figure 1, is an isometric view of a portion of a vault lighting pavement, embodying the invention. Fig. 2, is a plan view of a single glass body constructed in accordance with the invention. Fig. 3, is an isometric view of a broken portion of one of the glass bodies, showing the curved or oval formation of the sides, and spiral ridges and valleys. Fig. 4, is a vertical, sectional view of a portion of the inlay, taken upon the line of one of the valleys. Figs. 5, and 6, are diagrammatic and isometric views, respectively, of the ridges and valleys. Fig. 7, is a view of the glass body construction, as seen in Figs. 2 and 3, applied to the corner of a glass body of an angular form.

Similar numerals of reference indicate corresponding parts in all figures of the drawing.

Referring to the drawing, 10 indicates a section of concrete pavement, comprising a base 12, which as shown consists of a cast plate, such as steel, the requisite width to extend over a vault or other opening, and of the usual length. In this plate are rows of vertical openings 14, in parallel lines, as seen, with another row, and the opening in each row spaced apart equal distances from each other in the row and from respective openings in the parallel rows. These openings 14 are made of a determinate size and smaller in circumference than the glass block or body transmitting the rays of light. The upper surface and sides of the opening 14 are provided with a concentric flange 15, extending upwardly a slight distance from the upper, horizontal surfaces of the base plate 12. On the flange 15, and extending over the respective openings 14, are seated the small bodies of glass 16, preferably transparent, and as shown circular in form. These glass bodies, constructed in accordance with my invention, consist of a base portion 17, and an upper surface or top portion, or apex 18, as shown in parallel, horizontal planes, the glass body being made of the proper thickness for strength and transparency. The side wall of the glass body, which as shown is conoidal in form, is made in a single, outwardly-curved line, extending from the base line 17, to the top or upper surface of the block, which line forms the primary, inner, globular surface or plate 19, slightly drawn inwardly toward said upper surface of the perimeter upon which deflection of horizontal stresses upwardly originate. Constructively upon the sides of the glass body, and upon the outward curved plane 19, are alternate filaments or ridges 20, and valleys 21, extending around the glass body and having their bases mounted thereon. The upper surfaces of filaments or ridges 20 are outwardly curved in cross section, and are wide at the base line 17 of the body, and are gradually reduced in width in the direction of the top or upper surface 18, of the glass body. The valleys 21 are therefore narrow at the base line 17, of the glass body, and wider at the upper surface line of the top 18, of the glass body. These ridges 20 are placed upon the outwardly-curved plane 19, of the glass body, and extend from the base line 17 to the upper surface 18, of the glass body in gradually-ascending, inclined parabolic spiral planes, diagrammatically shown in Figs. 5 and 6, in which figures the ridges and valleys are shown upon a flat profile and upon an isometric view, respectively.

Let A, B, C, D, E, as seen in Fig. 5, indicate converging ridge lines, extending from the base line to the apex of the ridge lines drawn upon the flat surface 23 and spaced equi-distant from each other at the base line. Upon this surface the pitch line of the ridges upon the line A extends to the line E, at the top of the ridge line A, and the following pitch lines extend, respectively, from line B to line F, and, so continued, these vertical lines drawn upon the flat surface indicated, are drawn upon the lines of the apexes of the ridges 20, and as seen in Fig. 2, the last pitch line T, drawn upon the circular body 18, begins on the vertical line P, thus forming a continuity of pitch lines, each of which are drawn upon an inclined plane of 30°, more or less, approximating to the lines of force of horizontal stresses which are set up, and of course vary in different classes of materials, as their density varies. The valleys 21, between the ridges 20, at the same line 17, are narrow in width, and consequently the base lines of the ridges are wider than the valleys, the ridges decreasing in width gradually, upon the ascending lines of the inclined planes, which follow the outer curved plane 19, of the body, as seen in Fig. 4. At the base line 17, a slight dish is made as at 24, at the line of valley 21, to afford an immediate relief at the base line upon the beginning of the stresses from the subsequent expansion of the surface of the concrete, and to give the concrete its initial relief in its tendency to rise or swell. Upon the line of the upper surface of the glass body 16, the valleys 21 are increased in width and of increased depth, consequent upon the slight inward curve of the surface 19, before described, I have shown the lower surface of the glass body at a point a short distance inwardly from the lines of the valleys 21, depressed upwardly, as at 25, thus narrowing the base line 17, which sustains nominally the glass body in position. The glass body 16, constructed as above described, is then placed upon the plate 12, as seen in Fig. 1, the base portion 17, of the glass body, being placed upon the concentric flange 15, on said plate 12, and is thereby retained from accidental displacement out of line with the other glass bodies simultaneously positioned upon plate 12. A self hardening composition or material 26, such as cement concrete, is spread upon the upper surface of plate 12, and to a depth approximately to the line of the upper surfaces of the glass bodies 16, and the cement concrete packing closely against the side walls of the glass body entering the valleys 21, and forming practically and contiguous thereto matrices or molds, of associated ridges and valleys of concrete. The upper surface of the concrete is troweled and made smooth, and these blocks are then tapped slightly, and the vibration thus given causes the cement concrete to wedge beneath the base portions 17, of the glass blocks, thereby cementing the blocks 16 in position. Subsequently, dry cement is spread over the upper surface of the cement concrete, to absorb the surplus moisture. Upon the hardening of the cement concrete, the silicate of the cement concrete in contact with the side wall of the glass blocks prevents entry of water, while the cement concrete does not cohere with the glass.

In expansion of the cement concrete from the heat absorbed from the sun's rays and that of the glass blocks 16, a natural elastic property of both materials is subjected to the expansive forces, and the stresses resulting therefrom meet upon the ridges and valleys of the side walls of the glass bodies, are deflected toward the points of least resistance, and obtain a torsional, and at the same time a rising movement, which tends to reduce the stresses in line with the horizontal axis of the glass body and the matrix-like contour of the cement obtains a lesser diameter than the glass body, without compounding the stresses to which such pavements are subjected. While the ridges at the base line permit the relief from the stresses from expansion, as their width becomes less toward the top of the glass body 16, as a compensation for the expansion of the part of the glass body first affected by heat, the tendency to give the matrix-like formation of the cement concrete its full relief is obtained from the slight dish 24 in the lower portions of the valleys and the depth of the valley in the outward curved plane 19, at the apex of the glass body, which are wider and deeper, a sliding or slipping, frictional movement obliquely, upon the ridges 20, is afforded, in which movement the stresses are relieved and no injury occurs to the glass body. Conversely, weight of a body, to produce vibrations in the pavement, contract the surfaces of the matrix of the cement concrete, and relief from such vertical stresses are alike afforded, the invention preserving the glass blocks from all defects from chipping and breakage, arising from the expansive forces within themselves.

The invention, while shown applied to the side walls of a circular block or rosette, may be applied to any other form of block, and as shown in Fig. 7, in which 25 indicates a portion of a rectangular-shaped block to one corner or at the meeting point of two side walls, the ridges 20 and valleys 21 being shown in like manner as seen in Figs. 2 and 3.

The invention is applicable to mosaics and to the walls in which they are embedded, and from their fragile nature relief is necessary to preserve them from like stresses; also to all inlays in pavement walks, etc., vault doors in which cement concrete is employed, and particularly for roofs of cement concrete in which the inlay is of glass, and may be advantageously employed wherever the relief from inlays of different degrees of expansibility is desired. Without the possibility of an upward displacement of the matrix it would be impossible to obtain the relief sought.

Such other modifications may be employed as are within the scope of the applied claims.

Having fully described my invention, what I now claim as new and desire to secure by Letters Patent is:

1. A truncated conoidal inlay or block, and parabolic spiral ridges extending from the line of the base of said block to the upper surface of said block.

2. A stress-deflecting truncated conoidal inlay or block and parabolic spiral ridges extending from the line of the base of said block to the line of the upper surface of said block or inlay, and a matrix or mold confining the walls of the inlay and displaceably associated with the ridges on said conoidal walls so as to obtain a torsional and upwardly-displacing movement of the matrix and inlay in expansion and contraction thereof.

3. An inlay or block having upwardly-inclined spiral ridges whose generatrices emanate from within the base line of the block and extend convexly to the line of the upper surface of the block in parabolic spirals.

4. An inlay or block, and ridges upon said block extending from the line of the base of the block convexly to the line of the upper surface of said block or inlay in parabolic spirals.

5. A stress-deflecting inlay or block having an outwardly curved side wall and parabolic spiral ridges and valleys upon its sides, said ridges decreasing in width from the base line upwardly to the line of the upper surface of the block.

6. A stress-deflecting inlay or block having an outwardly-curved side wall, and spiral ridges integral therewith extending from the line of the base of the block to the line of the upper surface of said block, said block having valleys between the ridges, whose depth and width are increased at the line of the upper surface of said inlay or block.

7. A stress-deflecting inlay or block having outwardly-curved side wall, spiral ridges integral therewith extending from the line of the base of the block to the line of its upper surface, said blocks having valleys between said ridges whose depth and width are increased at the line of the upper surface of the block and whose surface is dished at the base line of the block.

8. In a concrete pavement, light-transmitting blocks embedded therein, the contiguous surfaces of the sides of which blocks and pavement consist of displaceably-associated interfitting spiral ridges and valleys extending from the line of the base of said blocks to the line of the upper surfaces, the width of which ridges is diminished in the direction of the line of the upper surfaces of the said blocks.

9. In a concrete pavement, light-transmitting blocks embedded therein, the contiguous surfaces of which blocks and pavement consist of displaceably-associated interfitting spiral ridges, and valleys extending from the line of the base of the blocks and pavement to the lines of the upper surfaces of said blocks and pavement, the valleys increasing in width in the direction of the line of the upper surface of said block and pavement.

10. In a concrete pavement, a base or support having openings, and light-transmitting blocks covering said openings, the contiguous surfaces of which blocks and pavement consist of displaceably-associated interfitting spiral ridges and valleys extending from the line of the base of said blocks to the line of the upper surface of said blocks and pavement, the valleys increasing in width in the direction of the line of the upper surfaces of the blocks and pavement and being dished at the line of the base of said blocks.

WILLIS M. PRATHER.

Witnesses:
 H. J. EMERSON,
 ANNIE L. GREER.

---

Copies of this patent may be obtained for five cents each, by addressing the " Commissioner of Patents, Washington, D. C."